Patented Feb. 6, 1940

2,189,278

UNITED STATES PATENT OFFICE 2,189,278

FRACTIONATION OF NITROGEN BASES

James R. Bailey and James L. Meadows, Austin, Tex., assignors to Union Oil Company of California, Los Angeles, Calif., a corporation of California No Drawing. Application June 12, 1937, Serial No. 147,994

7 Claims. (Cl. 260—283)

This invention relates to a method for fractionating nitrogen bases. More specifically it relates to the fractionation of mixtures of nitrogen bases with sulphur dioxide.

Nitrogen bases present in petroleum, and especially asphalt base petroleum and coal tar or coal tar residues or distillates may be separated therefrom by means of sulphur dioxide. Furthermore, nitrogen bases recovered by the destructive distillation of cottonseed meal or from cracked gasoline by treatment with zinc chloride by the Lachman process may be fractionated according to this process.

We have discovered that it is possible to fractionate basic nitrogen compounds by treating a mixture of nitrogen bases with sulphur dioxide to convert the bases to a water soluble sulphite, dissolving the bases treated with sulphur dioxide in water and then heating the water solution of sulphited bases to liberate and expel a portion of the sulphur dioxide present and thereby cause the liberated bases present which have lost their sulphur dioxide to become insoluble and thereby be removed from the solution. Thus the relative rates of dissociation of the acid sulphited bases becomes a practical method for resolving nitrogen base mixtures into components of different types.

In this specification when we use the term "sulphiting" we are referring to the extraction of nitrogen bases from their crude sources by the use of sulphur dioxide and water. Thus when kerosene or gas oil distillate is agitated with sulphur dioxide and water at ordinary temperature and then allowed to stratify into layers, the aqueous layer is found to contain the major portion of the nitrogen bases originally present in the kerosene or gas oil distillate. This process of converting the nitrogen bases into a water soluble form and separating them in water solution with sulphur dioxide will therefore be referred to hereinafter as "sulphiting." The term "sulphite brine" as used in this specification refers to the acid sulphites of the nitrogen bases in aqueous solution and the term "degassing" as used in this specification refers to the dissociation of the acid sulphites with liberation of free bases and evolution of sulphur dioxide.

It is, therefore, an object of the present invention to treat a mixture of crude nitrogen bases with an aqueous solution of sulphur dioxide to convert the bases into soluble sulphites and thereafter fractionate the bases which are in the form of sulphites by degassing the same, which consists in driving off a portion of the sulphur dioxide from the sulphite solution of nitrogen base sulphites and thereby liberating a portion of the bases contained therein.

It is a further object of this invention to partially sulphite a mixture of nitrogen bases with an aqueous solution of sulphur dioxide and thereby separate those bases in the mixture which are most reactive with the sulphur dioxide and form sulphites by such treatment from those bases present in the mixture which are less reactive with sulphur dioxide and remain in a free state by treatment with a limited or restricted amount of sulphur dioxide.

It is a further object of this invention to treat a mixture of nitrogen bases with a quantity of aqueous sulphur dioxide sufficient to react with only the most reactive bases in the mixture to form soluble sulphites, to separate the sulphite brine containing the sulphited bases from the free bases, to subject the free bases to further sulphiting with aqueous sulphur dioxide and thereby form a second brine containing nitrogen base sulphites in solution and thereafter fractionate the bases contained in the sulphite brines by subjecting the same to degassing operations in which sulphur dioxide in combination with bases present which dissociate readily is removed and the bases are thereby liberated and separately recovered.

Thus it is seen that a mixture of bases comprising quinolines and pyridines and other basic compounds including pyridine, isopyrindine and related substances may be readily separated by the process set forth in this specification. Where it is desired to resolve for example, simple mixtures of pyridine and quinoline, the mixture is first subjected to a sulphiting process in which, by the use of aqueous sulphur dioxide, these bases are converted into sulphites which are soluble in water. The water solution is then degassed by heating the same at a temperature of about 100° C. for a period of from one to four hours depending upon the concentration of the bases present. This step is known as the degassing operation in which the sulphites of the quinoline bases are dissociated and lose their combined sulphur dioxide. The liberated quinolines, being insoluble in the aqueous phase, layer out, and are separated therefrom by simple decantation. The pyridines, on the other hand, are not liberated by the degassing operation and, therefore, remain in the form of sulphites in the brine. The pyridines are recovered from the degassed brine, which has been freed of its quinoline content by the degassing operation, by causticizing the brine and liberating the pyridines. The ability of our process to effect a sharp separation between a mixture of quinolines and pyridines is especially valuable in fractionating the crude base mixtures obtained from coal tar, and as has been pointed out in the first part of this specification, nitrogen base mixtures obtained by the treatment of cracked California asphalt base gasoline with zinc chloride or by acid extraction may be readily resolved into bases of different type by our process.

It is to be understood from the objects of our invention and the description given in the examples that we may fractionate crude base mixtures into bases of different types by: (1) fractional sulphiting in which less than the required amount of aqueous sulphur dioxide is employed to convert the bases into soluble sulphites. By this method the less reactive bases remain free and are layered out and separated, or by (2) fractionally degassing the solution by base sulphites thereby liberating the bases in stages as the degassing progresses. Furthermore, it is to be understood that we may employ both the fractional sulphiting and fractional degassing methods together in order to fractionate base mixtures into bases of different types. According to this latter method the crude base mixture is partially sulphited in a plurality of steps to form a plurality of brines which are separately degassed to fractionally liberate the bases contained therein. The liberated bases are then separately recovered.

The degassing operation may be varied to suit the particular types of bases undergoing fractionation. For example, in some cases it is desirable to sulphite the crude base mixture at 0° C. or below since it may contain bases which do not form sulphites at the elevated temperatures. The degassing of the sulphite brine may then proceed at slightly above the sulphiting temperature and as the degassing slows down its rate may be increased by increasing the temperature.

In some cases it may be desirable to start the degassing at a relatively low temperature, and continuously increase the temperature to degas to cause constant liberation of the bases contained in the brine, and, continuously remove the bases as they are liberated and form an oil layer. It is obvious that the sulphur dioxide liberated by the degassing operation may be collected and reused in the sulphiting step.

While heating alone is usually sufficient to cause the degassing of the sulphited bases to proceed satisfactorily, we find that the degassing rate may be materially increased by blowing an inert gas such as nitrogen or air through the heated sulphite brine.

It is also to be understood that the method set forth in this specification is applicable to the fractionation of bases obtained from residual oils and from distillates such as gasoline, kerosene, gas oil, lubricating oil, and coal tar bases.

If a mixture of nitrogen bases containing pyrindines, quinolines and pyridines is completely sulphited and then progressively degassed according to our invention, the pyrindines or nonaromatic bases are liberated first and after layering out may be separated from the remaining quinoline and pyridine sulphite mixture. Upon further degassing the quinolines are liberated and these bases may then be separated from the remaining pyridines which are stable to the degassing operation and are only liberated in very restricted amounts upon prolonged heating.

The following is an example of our process as applied to the fractionation of nitrogen bases recovered from low temperature coal tar. In recovering the nitrogen bases from the low temperature tar the latter was diluted with carbon tetrachloride in the proportion of one volume of the coal tar to one volume of carbon tetrachloride. The carbon tetrachloride solution of coal tar was treated with an aqueous solution of sulphur dioxide. This treatment consisted in thoroughly agitating the carbon tetrachloride solution of coal tar with the aqueous solution of sulphur dioxide. This mixture was then allowed to separate into layers and the aqueous layer was decanted away from the carbon tetrachloride layer. The bases contained in the aqueous layer were liberated with caustic soda, decanted away from the aqueous layer and dried. Three hundred eighty seven cubic centimeters of the bases thus recovered were treated with successive portions of aqueous sulphur dioxide with separation of a portion of the bases as solid sulphites and sludge. The combined sludge and sulphites were then treated with 6NHCl. On neutralization with caustic ninety cubic centimeters of bases layered out and were recovered. These bases were perhaps acridine or acridine homologs since acridine forms a water insoluble acid sulphite.

The sulphite brine obtained in sulphiting the 387 gram sample of bases was degassed at 100° C. for 4½ hours. As a result of the degassing an additional 65 cubic centimeters of bases were recovered, as during degassing a portion of the bases lose their sulphur dioxide and are converted into free bases. These free bases being insoluble in the aqueous layer are permitted to stratify and then separated from the aqueous layer. This fraction of bases had a boiling point range of 210–290° C. and a refractive index of 1.53 to 1.59 which strongly indicates that they are quinolines.

The degassed aqueous solution remaining after separation of the quinoline fraction was then treated with caustic soda and yielded 165 cubic centimeters of free bases which had a boiling point range of 200–290° C. and refractive indices between 1.52 and 1.60. Since these bases form stable acid sulphites quinolines and pyrindines are excluded. These bases are perhaps diazines such as occur in cottonseed meal bases.

It will be noted that we have described the use of carbon tetrachloride as the diluent employed in thinning down the coal tar prior to extraction of the bases therefrom. We may also employ naphtha or benzol for thinning agents in place of the carbon tetrachloride.

As a second example of the method of carrying out this invention a fraction of crude nitrogen bases having a boiling point range of 218° to 225° C. and a refractive index ($n$–25/D) of 1.4960 was mixed in equal proportions with a sample of quinoline having a boiling point of 237° C. and a refractive index ($n$–25/D) of 1.6245. This mixture of bases had a refractive index of 1.5602.

To 50 cubic centimeters of the base mixture there was added 67 cubic centimeters of a saturated water solution of sulphur dioxide (saturated at 25° C.). The amount of sulphur dioxide added was sufficient to extract 25% of the bases contained in the 50 cubic centimeter mixture.

As a result of the addition of the aqueous solution of sulphur dioxide to the base mixture three layers were formed:

A. A supernatant oil layer
B. An aqueous layer, and
C. A lower oil layer

Layer A was completely ether soluble indicating that this layer contained only free nitrogen bases. This material had a refractive index of $(n-25/D)$ 1.5460.

The bases in layer B have an $n-25/D$ 1.5647. Layer B was degassed and the resulting base layer when dried gave an $n-25/D$ 1.5410.

The sulphite brine was treated with excess NaOH. The bases thus liberated gave, when dried, an $n-25/D$ 1.5832.

Layer C contained about 16% of material which was insoluble in ether. The refractive index of layer C was $n-25/D$ 1.5764.

Layer A was extracted with aqueous sulphur dioxide until one third of this layer was converted into sulphites. The sulphited layer will hereinafter be referred to as layer D and the free bases remaining will be designated as layer E.

Layer D was fractionally degassed at 100° C. and the following base fractions were obtained:

(1) 5.0 cubic centimeters of free base having a refractive index $(n-25/D)$ of 1.5441.
(2) 2.5 cubic centimeters of free base having a refractive index $(n-25/D)$ of 1.5801.
(3) 2.0 cubic centimeters of free base having a refractive index $(n-25/D)$ of 1.5714.

These bases were liberated with caustic from the undissociated sulphite brine.

Layer E was converted completely to acid sulphites by treatment with an aqueous solution of sulphur dioxide and degassed into the two following fractions:

(1) 3.0 cubic centimeters of free base having a refractive index $(n-25/D)$ of 1.5140.
(2) 4.0 cubic centimeters of free base having a refractive index $(n-25/D)$ of 1.5510.

After recovery of the bases by degassing layer E the sulphite brine remaining was treated with caustic soda and only a trace of bases appeared as a light emulsion which indicated that layer E contained only a small amount of pyridines. The pyridines are not liberated from the sulphite brine by degassing. However, after fractional separation of bases from sulphite brine by degassing the sulphited pyridines which remain undissociated in the brine may be recovered therefrom by treating the brine with caustic soda thus liberating the pyridine bases.

Layer C was fractionally extracted with an aqueous solution of sulphur dioxide. Ten cubic centimeters of this layer were treated with sulphur dioxide dissolved in water and then allowed to separate into an oily layer and an aqueous layer. The oily layer, comprising about three cubic centimeters in volume had a refractive index of $n-25/D$ 1.5792 as against the original refractive index value of 1.5764. The aqueous layer or sulphite brine was degassed at 100° C. for two hours and as a result of the liberation of a portion of the sulphur dioxide from the sulphite brine 4 cubic centimeters of free bases were liberated and recovered having a refractive index $(n-25/D)$ of 1.5870. The brine now containing only those bases which are not liberated by degassing, was treated with caustic soda. As a result of this treatment 3 cubic centimeters of free bases were liberated and recovered, which had a refractive index $(n-25/D)$ of 1.4922.

As a third example, equal volumes, 10 ml. respectively, of 2-methylpyridine and 2-methylquinoline were sulphited in 20 ml. of water and the resulting solution degassed for 4 hours at 25° C. Only a negligible amount of free bases layered at 25° C. The temperature of the sulphite brine was raised to 100° C. and the solution degassed for four hours. About 9 ml. of bases separated which when dried and distilled gave $n-25/D$ 1.6090. The sulphite brine was treated with excess sodium hydroxide and the bases separating were distilled and dried. This base volume, approximately 9 ml., had an $n-25/D$ 1.4980.

Thus it is seen that mixtures of nitrogen bases may be readily resolved to various types by our fractional extraction and degassing method. As seen in example two, the crude base mixture may be treated with aqueous sulphur dioxide in an amount insufficient to convert the whole mixture into water soluble sulphites and then this mixture may be allowed to stand and the free bases which have not reacted with the sulphur dioxide to form soluble sulphites due to their lower reactivity with sulphur dioxide, may be separated from those bases in solution in the aqueous sulphur dioxide. The sulphite brine containing the bases in combination with the sulphur dioxide in the form of sulphites may then be heated and degassed to liberate those bases which are incapable of remaining in the form of sulphites at the elevated temperature. After the degassing step the liberated bases form a separate layer or are distilled from the brine and are simply recovered from the brine by decantation. If desired, the liberation of the bases by degassing may take place in stages. If the sulphite brine is only subjected to a degassing operation for a limited amount of time the bases which form the loosest combination with the sulphur dioxide are liberated. These are the bases which are the most highly dissociated and are readily liberated by only a limited amount of degassing. Further degassing causes a further liberation of bases which may also be separately recovered. Thus it is seen that the degassing operation may take place in several steps in which there is removed by each step a portion of the sulphur dioxide contained in the sulphite brine. As a result there is obtained by each degassing operation a liberation of a further quantity of the bases and as has been explained, as the degassing proceeds, those bases which are more firmly held in combustion with the sulphur dioxide as sulphites are liberated and may be separately recovered.

Finally the degassed sulphite brine which will yield no further free bases on further degassing may be subjected to treatment with caustic soda for liberation of those bases which are not dissociated by the degassing operation. The pyridines are examples of bases which are not liberated by the degassing operation and must be liberated with caustic soda.

As has already been explained, the crude mixture of bases may be fractionated by limiting the amount of aqueous sulphur dioxide employed during the sulphiting step to an amount which will react with only a portion of the bases; i. e., those bases present which are most reactive with the sulphur dioxide. This mixture may then be allowed to form a brine layer containing bases in the form of sulphites, which are in solution in the water and which may be fractionated by degassing, as explained above, and an oily layer of free bases which may be sulphited again to produce soluble sulphites which in turn may be fractionated by the degassing operation. Finally, the sulphite brines remaining after the degassing steps may be causticized to liberate the bases contained therein which do not liberate by degassing.

It is to be understood that the foregoing is merely illustrative and that the invention is not limited thereby but includes changes and modifications within the scope of the appended claims.

We claim:

1. A process for fractionating nitrogen base mixtures which comprises converting a plurality of the bases contained in said mixture of bases into an aqueous solution of water soluble sulphites, removing a sufficient portion of the sulphur dioxide combined with said bases to render water insoluble the more readily dissociatable base, separating the liberated water insoluble base from the remaining nitrogen base sulphites and recovering independently nitrogen bases from the remaining base sulphites.

2. A process as in claim 1 in which the sulphur dioxide is removed by heating said mixture of water soluble sulphite.

3. A process as in claim 1 in which the separation of sulphur dioxide is facilitated with an inert gas.

4. A process as in claim 1 in which the original mixture of bases contains pyridine and quinoline and in which a sufficient amount of sulphur dioxide is removed from the mixture of water soluble sulphites to liberate quinoline and in which said quinoline is separated from the remaining water soluble sulphites.

5. A process for fractionating nitrogen base mixtures which comprises converting a plurality of the bases contained in said mixture of bases into an aqueous solution of water soluble sulphites, removing a sufficient quantity of the sulphur dioxide combined with said bases to render water insoluble the more readily dissociatable base, separating the water insoluble base from the remaining nitrogen base sulphites, removing a further portion of sulphur dioxide combined with the remaining bases to render water insoluble the more readily dissociatable base contained in said remaining mixture of nitrogen base sulphites and separating said water insoluble base from the remaining solution.

6. A process as in claim 5 in which the sulphur dioxide is removed by heating said mixture of water soluble sulphite.

7. A process as in claim 5 in which the separation of sulphur dioxide is facilitated with an inert gas.

JAMES R. BAILEY.
JAMES L. MEADOWS.